United States Patent [19]

Albohn

[11] 4,257,891
[45] Mar. 24, 1981

[54] DUAL DISC PRESSURE RELEASE VALVE

[75] Inventor: Arthur R. Albohn, Whippany, N.J.

[73] Assignee: Komline-Sanderson Engineering Corp., Peakpack, N.J.

[21] Appl. No.: 78,957

[22] Filed: Sep. 26, 1979

[51] Int. Cl.³ .............................................. C02C 1/10
[52] U.S. Cl. ................................ 210/221.2; 210/523
[58] Field of Search ................ 210/220, 221, 519, 523

[56] References Cited

U.S. PATENT DOCUMENTS

| | | | |
|---|---|---|---|
| 2,330,589 | 9/1943 | Juezz | 210/221 P |
| 3,446,488 | 5/1969 | Maiz et al. | 210/221 P |
| 3,670,056 | 7/1972 | Haymore | 210/221 P |
| 3,820,659 | 6/1974 | Parlette | 210/221 P |
| 4,078,026 | 3/1978 | Fallenius | 210/221 P |

*Primary Examiner*—John Adee
*Attorney, Agent, or Firm*—Watson, Cole, Grindle & Watson

[57] ABSTRACT

A pressure reducing control valve assembly for feeding an aeration fluid stream to a flotation tank includes a pair of overlapping discs, one having a central opening and affixed to an end of a tube, and the other imperforate and outwardly movable away from the surface of the fixed disc to define a valve opening having a predetermined land width. Optimum size of air bubbles for the objective desired is obtained by controlling the dimensions of a shear zone established by the land width within which the fluid stream is intensely turbulent for a short period of time, thereby causing air bubbles to form and then be discharged immediately into the liquid within the tank without having had time to coalesce.

10 Claims, 6 Drawing Figures

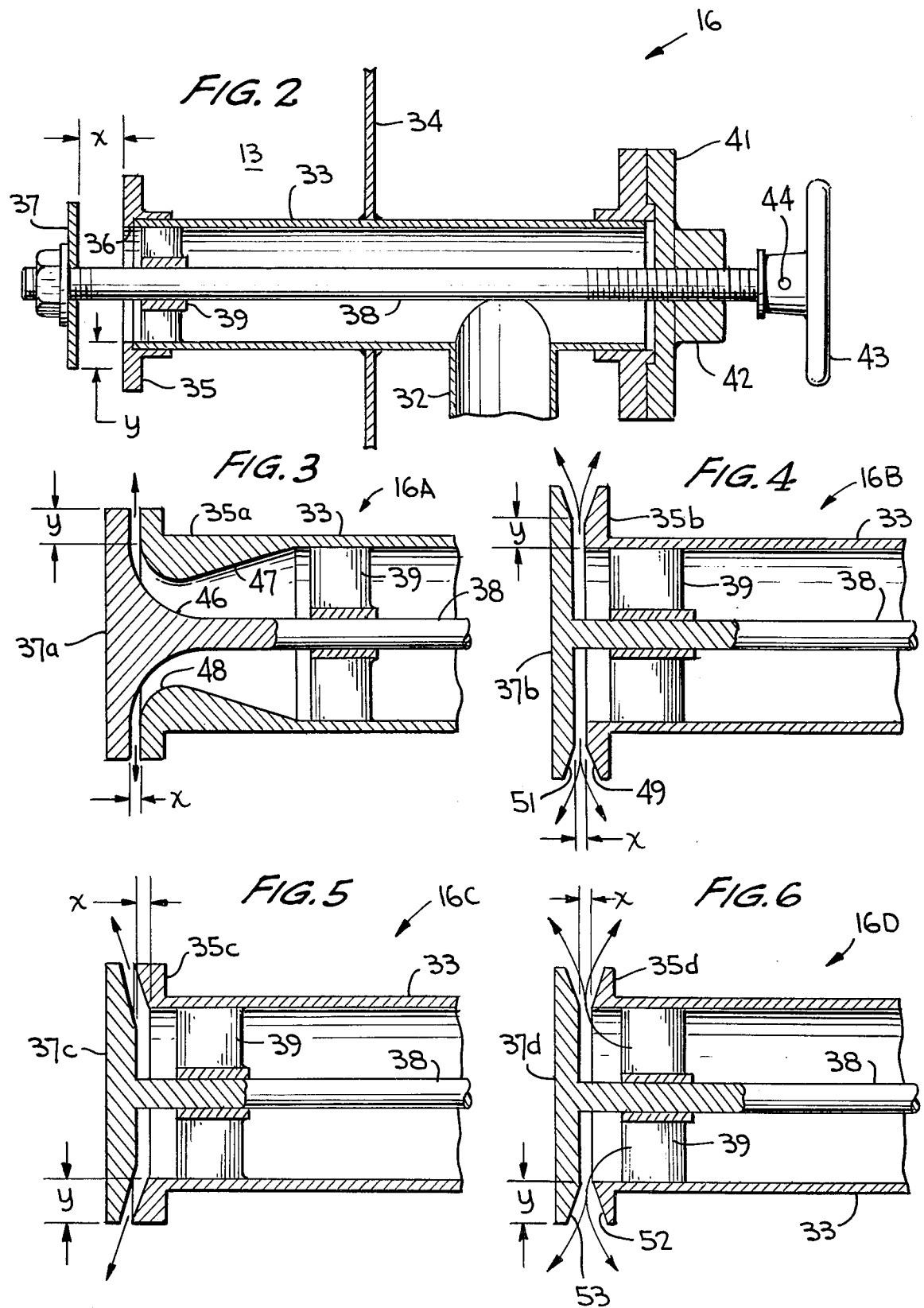

DUAL DISC PRESSURE RELEASE VALVE

BACKGROUND OF THE INVENTION

This invention relates generally to an improvement over pressure reducing control valves utilized for feeding an aeration fluid stream to a flotation tank.

One of the problems prevalent in dissolved air flotation systems is disturbance of the float blanket by turbulence resulting from rapidly rising large bubbles issuing from the depressurized recycle stream, which has been subjected to air under pressure in order to dissolve the requisite amount of air. The formation of large bubbles appears to result from at least two design characteristics. One is related to the valve or pressure reducing element itself (orifice, nozzle, valve, etc.) and its own design characteristics, and the other relates to other velocity and impingment effects that occur in the pipeline between the pressure reducing elements and the point of introduction into the flotation tank. These velocity and impingement effects cause coalescence of small bubbles into the undesirable larger ones, either through direct contact of one bubble with another, through surface effects, or via some other mechanism.

Thus, with ordinary control valves, a large percentage of the air or gas released on depressurization is in the form of relatively large bubbles, which rise rapidly from the mix chamber or point of entrance of the inlet flow to the top of the flotation tank, sometimes with such velocity and creating such as upward flow velocity of water in the tank that the float blanket above the mix chamber or inlet area is disrupted. This acts in opposition to the function of the dissolved air flotation system in that it makes the skimming and removal of floated solids less efficient, with lower solids levels in the discharged material, and often is so severe that the material which has been floated to form a blanket is re-dispersed and must pass through the action of the system all over again, thereby further reducing the efficiency.

SUMMARY OF THE INVENTION

It is therefore an object of the present invention to provide a pressure reducing control valve assembly for supplying a flotation tank with aeration fluid in such a manner as to produce high quality white water, free from large bubbles, and with a reasonably narrow range of bubble sizes, large enough to provide flotation effects to the solid particles to which they become attached, and yet small enough not to rise so rapidly as to bypass the particles, develop a strong upward current in the flotation tank, and cause disruption and dispersion of the float blanket, the formation of which is the major object of the flotation process.

Another object of the invention is to provide such a control valve assembly which is capable of being readily scaled up or down to other sizes, since the parameters of its design are well established and can be carefully and precisely controlled. This is not possible with presently available valves, which are designed from size to size within the constraints of standardized pipeline connections, and within economic limitations of metal usage, weight, etc. As a result, their substantial internal surfaces are not scaled up from size to size and are often rough due to the manner of a manufacture (casting), and they provide ample surface and nucleation points at which larger bubbles than desired may form.

A further object of the present invention is to provide such a control valve assembly which does not have a jet or nozzle type discharge point, which in addition to the effects of large bubbles causes hydraulic turbulence all its own, since the velocity gradients from such a mass discharge do not disappear quickly but may be directed or reflected toward the surface of the flotation tank and further disrupt the float blanket, sometimes even when there is no air present. The present assembly is in the form of a dual disc valve effecting a 360° discharge pattern and a thin sheet form of discharge so that the velocity of the fluid leaving the valve is quickly dissipated into its surrounding environment, with no residual high velocity stream to move upward into the region of the float blanket.

A still further object of the invention is to provide such an assembly which includes a pair of overlapping discs, one having an axial opening and fixed at the end of the tube, and the other being imperforate and movable outwardly away from the surface of the fixed disc. A valve opening is thereby defined having a predetermined land width so that a predetermined characteristic size of air bubbles is controlled by a shear zone established by such land width within the fluid stream is intensely turbulent for a predetermined short period of time thereby causing the air bubbles to form and then be discharged into the liquid within the tank without having had time to coalesce.

A still further object of this invention is to provide such an assembly wherein the extent of the land width may be determined by the extent of the overlap between the discs, and means are provided for axially moving the imperforate disc relative to the fixed one for adjusting the extent of the valve opening located between the discs.

Other objects, advantages, and novel features of the invention will become more apparent from the following detailed description of the invention when taken in conjuction with the accompanying drawings.

BRIEF DESCRIPTION OF THE DRAWINGS

FIG. 2 is a detailed view at a slightly enlarged scale of one form of a pressure reducing control valve assembly of the invention;

FIG. 3 is a view similar to FIG. 2 of part of a valve assembly according to another embodiment, and illustrating an example of opposed contoured surfaces of the discs; and FIGS. 4, 5 and 6 are views similar to FIG. 3 of further embodiments providing various exit flow patterns.

DETAILED DESCRIPTION OF THE INVENTION

Figure 1:
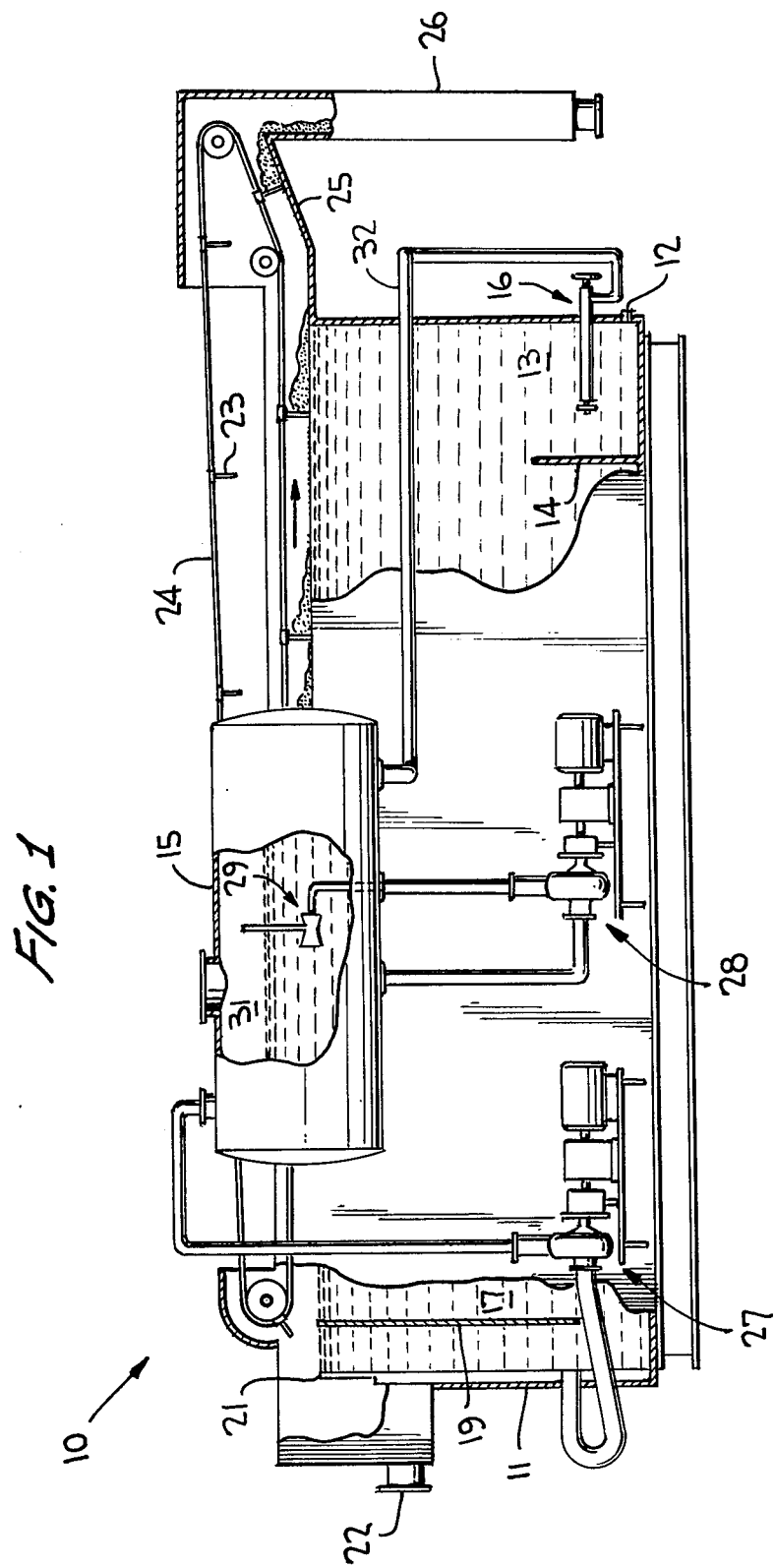
FIG. 1 is a schematic illustration, in side elevation, partly broken away, of one form of a flotation unit incorporating the invention.

Turning now to the drawings, wherein like reference characters refer to like and corresponding parts throughout the several views, a flotation unit, generally designated 10 in FIG. 1, includes a flotation tank 11 having a main inlet valve 12 for feeding influent, or liquid to be clarified, into an inlet-mixing chamber 13 defined at the bottom inlet end of the tank by a box-like enclosure 14 surrounding the inlet valve 12 and a pressure reducing valve assembly 16. The purpose of the mixing chamber is to provide a relatively confined volume within which the inlet flow and the aeration fluid can be mixed just prior to their generally upward and downstream flow toward the effluent end of the flotation unit. The influent enters the mixing chamber and is mixed with a recirculated air-water mixture piped from a retention or aeration tank 15 and into the flotation tank via the pressure reducing control valve assembly 16, shown more clearly in FIG. 2 and to be more fully described hereinafter. Depending upon the application, the feed or influent may be pre-treated with polymer solutions to aid in flocculation, attachment of air bubbles, and flotation. The mixing chamber is sufficiently small so there is latimate mixing of the two streams, yet large enough so that there is not too much turbulence involved which could break up the flocculation desired, or cause high velocity currents which could disrupt the blanket of float at the top of the tank.

The flow then passes from a zone at the mixing chamber end of the tank, through the tank and to a zone 17 at the opposite end of the tank. During this flow, the material to be removed from the influent is removed by flotation in a known manner. The effluent flow, or clarified part of the recycle, passes under a baffle 19, over an adjustable weir 21 and finally out of the unit through an outlet 22.

The float rises to the surface of the unit, where it is caught by float skimmer blades 23 driven by an oversized roller chain 24 and travels up a sludge discharge ramp 25 and out through a float discharge 26.

A portion of the clarified effluent is taken from the bottom of the discharge end of the flotation tank by a recirculation pump 27 to the retention or aeration tank 15 in which the recycle flow (clarified effluent) is subjected to air under pressure such that the water leaving the aeration tank is essentially saturated with air. The water level in the retention tank is maintained by a liquid level controller in a typical manner. When additional air is required, it is metered into the retention tank by means of an air control panel thereby maintaining the liquid level.

A reaeration pump 28, typically but not exclusively as disclosed in U.S. Pat. No. 3,175,687, commonly owned herewith, circulates the water in the retention tank either through a series of eductors 29 or by other means such as spray nozzles, packed columns, etc. so as to effect efficient and reliable dissolution of air in the water under pressure and give positive and rapid saturation of the water with air or other desired gases, such as oxygen, nitrogen, etc. In the eductor system the principle of an aspirator pump drawing air from an air cushion 31 is used. One or more eductors may be used depending on the size of the flotation tank and the retention tank. The recycled water with dissolved air is finally discharged via piping 32 into inlet mixing chamber 13 through the pressure reducing control valve assembly 16 of the invention.

As shown in FIG. 2, assembly 16 includes an elongated tube 33 extending through a wall 34 at the inlet end of the flotation tank, piping 32 terminating into the tube as shown. An annular disc or valve plate 35 has an axial opening 36 therein and is affixed to an inner end of the tube. The diameter of this opening may be the same as the inner diameter of the tube. An imperforate disc 37 overlaps disc 35 in parallel relationship and is mounted at an end of an elongated rod 38 extending coaxially through the tube. The rod may be supported at the inner end of the tube by means of a spider-type bearing 39 having spaced radial arms, and extends therethrough as shown. The outer end of the rod extends through a cover plate 41 and through a threaded bushing 42 containing packing gland, O-ring, or other type of liquid seal, a handle 43 being affixed as by a pin 44 to the terminal inner end of the rod. The rod is externally threaded as shown for engagement with the threaded bushing so that, upon turning the handle, the rod is moved axially and disc 37 is accordingly caused to move toward and away from the outer surface of disc 35. A spacing x between the discs therefore defines the valve opening, the extend of which may be adjusted by the axial movement of disc 37 through manipulation of the rod by the handle. The extent of the annular overlap y determines the land width between disc 37 and valve seat 35, and therefore the length of the shear zone across which the pressure drop occurs. The size distribution of bubbles formed during pressure reduction is a function of the rate of pressure release, the degree of shear, and similar factors affecting nucleation for bubble formation. The present valve assembly, therefore, effects the maximum number of sites for bubble initiation to thereby maintain individual bubble size at a minimum. And, the valve assembly has a 360° discharge pattern, and may be located anywhere within the mixing chamber to provide optimum mixing and minimum turbulence.

The pressurized air saturated stream, fed from aeration tank 15 via piping 32, is supplied to the flotation tank through pressure release valve 16 at which point the air can no longer stay in solution and is released in the form of very small white bubbles. If the bubbles are small enough, they rise to the surface in the tank only slowly, attaching themselves as they go to the particles of solids in the inflow to the flotation tank helping those particles to rise to the surface. The 360° discharge pattern of the present dual disc pressure release valve and the thin sheet form of the discharge, cause the velocity of the fluid leaving the nozzle to be quickly dissipated into its surrounding environment, with no residual high velocity stream to move upward into the region of the flow blanket.

The present dual disc valve also provides the possibility of a variety of valve discharge configurations, not made possible by prior art valves. The mechanics of pressure release of these known valves, the configuration thereof and any chambers or piping subsequent to the discharge point of the valve or itself, all have an effect on the quality of white water produced, i.e., the percentage of air that ends up as very small bubbles and that which forms larger and undesirable air bubbles.

Experiments have shown that the use of the dual disc valve according to the invention, appropriately sized so that the orifice gap or valve opening x is small (about ⅛ inch or less) and so that the width of the land y (the length of the spaced parallel disc surfaces) across which the flow must pass is of similar dimensions, about ⅛ inch to ½ inch or so, gives an exceptionally high quality of white water, with the bubbles finely dispersed and with no large bubbles to interfere with the float blanket. The narrow width of the valve opening on a relatively large diameter also serves to spread the discharge flow over a wide area, so that its velocity is dissipated quickly once it leaves the disc, and there is no high velocity "jetstream" to cause turbulence and its attendant problems with the floating material and the float blanket itself.

It should be noted that, although disc 35 is shown to be larger than disc 37, disc 35 may be the same size or smaller than disc 37 for some applications so long as the discs overlap to define a shear zone. Also, a number of design parameters exist which may be varied depending on the application and the characteristics of the effluent desired. These would be diameters of the discs, and the relationships of those diameters one to the other; the diameter of opening 36; the extent of overlap of the two discs (i.e., the length of the shear zone, within which the fluid is intensely turbulent for a very short period of time, causing bubbles to form and then be discharged immediately into the bulk of the flotation tank liquid without having had time to contact one another or other surfaces and thereby coalesce); the width of the adjustable valve opening x between the adjacent faces of the discs; and others, including the actual contours of the inner face of disc 37 and the inside of the discharge end of tube 33 either or both of which may be contoured in a variety of matching or individual ways, including conical, ovoidal, hemispherical, frusto-conical, etc.

For example, FIG. 3 illustrates part of a pressure reducing control valve assembly 16A which is the same in all respects in structure and function as that of assembly 16 except for the discs having opposed contours. Disc 37a may be thread onto rod 38 as at 45, or may be otherwise affixed to the rod or made integral therewith. The inner surface of disc 37a is arcuate in cross-section as at 46, and a portion of this inner surface at overlap y is flat and lies parallel to the outer confronting surface of disc 35a. The inner surface of tube 33 is frusto-conical as at 47 and blends via an arcuate shape 48 into the flat outer surface of disc 35a. These confronting contour surfaces, which may be of a variety of other matching contours, effect a streamlining of the flow so as to minimize turbulence at the entrance to the discharge slit defined by the peripheral overlap y. Premature bubble formation may thereby be prevented through the elimination of any low pressure zones within the assembly. Thus, the predetermined characteristic size of air bubbles is more positively controlled by the shear zone established by the land width y within which the fluid stream is intensely turbulent for a predetermined short period of time.

Various exit flow patterns may be established by the arrangements shown in FIGS. 4, 5 and 6 which respectively illustrate partial pressure reducing control valve assemblies 16B, 16C and 16D which, as in FIG. 3, are the same in all respects in structure and function as that of assembly 16 except for the discharge exit surfaces. For example, portions of discs 35b and 37b overlap in FIG. 4 to form shear zone y although peripheral surfaces 49 and 51 of the discs lying outwardly of the shear zone diverge outwardly toward the edges of the discs. This exit tapering of the discs tend to improve valve performance under certain conditions for the discharge flow which changes (as shown by the arrows) upon exiting the shear zone.

In FIG. 5, shear zone y is established by overlapping confronting surfaces of discs 37c and 35c which lie parallel to one another but are tapered in the same direction toward the outer surface of disc 37c. The direction of flow, as shown by the arrows, is thus altered by changing the angle made by the parallel confronting surfaces from 90° relative to the valve axis (as in FIG. 1) to that shown in FIG. 5. This may be desirable under certain conditions for improving the discharge flow characteristics.

Surfaces 52 and 53 likewise diverge in FIG. 6 outwardly toward the edges of the discs, as in FIG. 4, except that these diverging surfaces establish shear zone y between the discs. The fluid flow through this shear zone is intensely turbulent but multi-directional as shown by the arrows. The included angle formed by surfaces 52 and 53 must not be too great, since the intended effect of shear between the surfaces may be diminished or lost so that the flow through overlap y would have only the effect of a valve with a peripheral discharge. Such would nevertheless be beneficial for mixing yet minimizing the turbulence in the flotation tank.

Discs or valve plates 35a, 35b, 35c and 35d of the aforedescribed embodiments may be made integral with the inner ends of their respective tubes 33, as shown, or they may be mounted in place as separate elements (as disc 35 in FIG. 2) without departing from the invention.

A further advantage of the present design, and another design variable, is the extreme flexibility of the design with regard to the materials of construction which can be used. Since only discs are involved, these could easily be made of any metal, plastic, plated material, composite material, ceramic, glass, or other material, depending of the desire or need for corrosion resistance or erosion resistance. Further, they are inexpensive components to make and install and in the event of wear, can readily be replaced without dismantling the entire valve, simply by taking it out of service for a short period of time. Finally, although the basic design conceives of perfectly flat discs, it is possible to contour the surfaces with tapers, curves, or other more complex shapes to improve valve performance under certain conditions.

Obviously, many other modifications and variations of the present invention are made possible in the light of the above teachings. It is therefore to be understood that within the scope of the appended claims, the invention may be practiced otherwise than as specifically described.

What is claimed is:

1. In a flotation unit having a pressure reducing control valve assembly for supplying a flotation tank with an aeration fluid stream, the improvement wherein said valve assembly comprises an elongated inlet tube of a predetermined inner diameter, a fixed annular valve plate extending transversely at a terminal end of said tube and having an axial opening, a transversely extending imperforate disc valve movable toward and away from an outer surface of said valve plate respectively between valve closing and valve opening positions, said disc valve having an inner surface overlapping with said outer surface to define a valve land width, which establishes the length of a shear zone across which a pressure drop occurs, and means supporting said valve disc for axially shifting said disc to adjust the extend of said valve opening position, the ratio of the extend of said valve opening position to said land width being not greater than 1.0, whereby a predetermined size of air bubbles is controlled by said shear zone within which the fluid stream is intensely turbulent for a predetermined short period of time thereby causing air bubbles to form and then be discharged into liquid within said tank without having had time to coalesce.

2. In the flotation unit according to claim 1, wherein said opening of said valve plate is of a size substantially equal to said inner diameter for determining the extent of said land width and thus the extned of said shear zone.

3. In the flotation unit according to claim 1, wherein said valve plate and said disc have unequal outer diameters for determining the extent of said land width and thus the extent of said shear zone.

4. In the flotation unit according to claim 1, wherein said inner and outer surfaces lie parallel to one another at said inner shear zone, a portion of said inner surface between said shear zone and said supporting means being smoothly contoured, and a confronting inner surface at said terminal end of said tube having a contour matching said inner surface position, whereby the fluid stream is streamlined to thereby minimize turbulence at the entrance to said shear zone.

5. In the flotation unit according to claim 1, wherein portions of said inner and outer surfaces lie outwardly of said shear zone and diverge outwardly toward the edges of said valve plate and said disc valve, whereby the fluid flow is caused to change upon exiting said shear zone.

6. In the flotation unit according to claim 1, wherein said inner and outer surfaces are parallel at said shear zone and together taper toward an outer surface of said disc valve to thereby control the direction of flow.

7. In the flotation unit according to claim 1, wherein said inner and outer surfaces at said shear zone diverge outwardly toward the edges of said valve plate and said disc vavle, whereby exit flow from said shear zone is multi-directional.

8. In the flotation unit according to claims 1, 2, 3, 4, 5, 6 or 7, wherein said shifting means comprises an elongated rod coaxial with said tube and being axially movable relative thereto, said valve disc being mounted at one end of said rod means at the opposite end of said rod for axially moving same.

9. The the flotation unit according to claim 8, wherein said rod is coaxially supported within said tube by means of a bearing element through which said rod extends.

10. In the flotation unit according to claim 1, wherein said means at said opposite end comprises an internally threaded support element engaging a threaded portion of said rod.

* * * * *